United States Patent [19]

Mauvernay et al.

[11] 3,818,000

[45] June 18, 1974

[54] 3-ALKOXY-OR 3-ARYLOXY-2-(DIARYL-HYDROXY)-METHYL-PROPYLAMINES

[75] Inventors: Roland Yves Mauvernay, Riom; Norbert Busch, Loubeyrat; Jacques Simond, Chamalieres; Jacques Moleyre, Nozac, all of France

[73] Assignee: Centre Europeen De Recherches Mauvernay C.E.R.M.

[22] Filed: Mar. 28, 1972

[21] Appl. No.: 238,969

Related U.S. Application Data

[62] Division of Ser. No. 447, Jan. 2, 1970, Pat. No. 3,676,496.

[30] Foreign Application Priority Data
Jan. 3, 1969    Great Britain .................. 452/69

[52] U.S. Cl. 260/247.7 C, 260/247.7 A, 260/293.83, 260/326.5 R, 260/326.5 M
[51] Int. Cl. ............................................ C07d 87/32
[58] Field of Search. 260/247.7 A, 247.7 C, 293.83, 260/326.5 R, 326.5 M

[56] References Cited
UNITED STATES PATENTS 2,881,174  4/1959  Wright ............................ 260/570
2,881,216  4/1959  Wright ............................ 260/570
3,723,476  3/1973  Nakanishi et al. ............. 260/347.7

OTHER PUBLICATIONS

Wright, Chem. Abstracts 55:13405-6(1961).

Primary Examiner—G. Thomas Todd
Attorney, Agent, or Firm—Eric H. Waters

[57] ABSTRACT

A 3-alkoxy- or 3-aryloxy-2-(diaryl-hydroxy)-methyl-propylamine of the formula

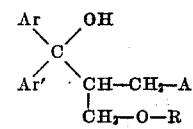

in which Ar and Ar', which may be the same or different, are unsubstituted or substituted aryl groups, R is an aliphatic, aryl or arylaliphatic group, and A is a secondary or tertiary amino group, or an acid addition salt thereof. The compound has coronarodilating properties and central nervous system activity.

1 Claim, No Drawings

3-ALKOXY-OR 3-ARYLOXY-2-(DIARYL-HYDROXY)-METHYL-PROPYLAMINES

CROSS-RELATED APPLICATION

This application is a division of our earlier application Ser. No. 447, filed Jan. 2, 1970, and issued July 11, 1972 as U.S. Pat. No. 3,676,496 claiming the priority of our earlier application filed in Great Britain on Jan. 3, 1969.

This invention relates to certain novel substituted propylamines.

We have found that 3-alkoxy- or 3-aryloxy-2-(diarylhydroxy) methyl-propylamines of the formula

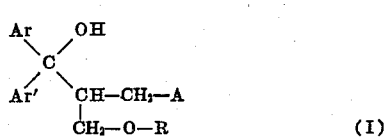
(I)

in which Ar and Ar', which may be the same or different, are unsubstituted or substituted aryl groups, R is an aliphatic, aryl or arylaliphatic group, and A is a secondary or tertiary amino group, and their acid addition salts, have remarkable coronarodilating properties and central nervous system activity, and certain of them have bactericidal and anti-virus activity. These compounds are novel and constitute one aspect of the present invention.

It is known that 2-hydroxy-3-alkoxy (and 3-aryloxy)-propylamines have a blocking effect on β-adrenergic receptors and a number of patents refer to these compounds. For example, Belgian Pat. No. 669 401, Dutch Pat. Nos. 64/09883, 65/04268, 66/00177, 66/05692 and 66/08099, French Pat. No. 5190M and U.S. Pat. No. 3 309 406 describe compounds of the formula:

(II)

in which A is a secondary or tertiary amino group and R' is an unsubstituted or substituted aryl group, and Belgian Pat. No. 669,789 describes compounds of formula II in which R' is an aliphatic group.

In U.S. Pat. applications Ser. NO. 749 277 (Aug. 1, 1968) and 842 388 (July 16, 1969) Compounds are described following the formula

(III)

in which A and R have the above-stated meanings and X is —O—CO—Ar or —NH—CO—Ar, where Ar has the above-stated meaning. While in the compounds of formula II described in the above-mentioned patent specifications, the β blocking effects are preponderant, such effects are substantially non-existant in the compounds of formula III, and the latter have, on the other hand, remarkable anti-arrythmic and coronaro-dilating effects.

Finally, compounds having coronarodilating properties are described in Belgian Pat. No. 710,852 which describes compounds of the formula:

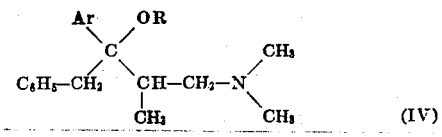
(IV)

and in South African Patent 67/5430 which describes compounds of the formula:

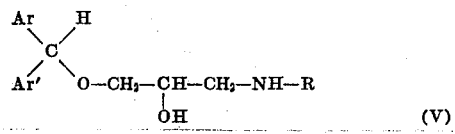
(V)

in the above formulae R, Ar and Ar' have the above-stated meanings.

The compounds of formula I can be prepared from known compounds of formula II by a two stage process. In the first stage, chlorine is substituted for the hydroxyl group on the carbon atom in the 2- position of the compound of formula II by the action of thionyl chloride, preferably in chloroform. In the second stage, the 3-alkoxy (or 3-aryloxy)-2-chloro-propylamine prepared in the first stage is condensed with a bis-aromatic ketone (containing unsubstituted or substituted aryl groups corresponding to the desired values of Ar and Ar') in the presence of sodium in liquid ammonia to give the desired compound. The reactions may be illustrated as follows:

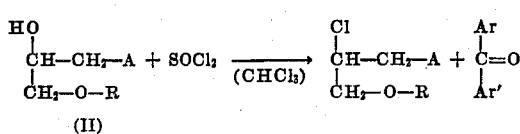

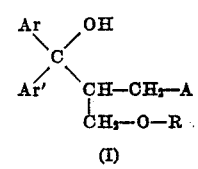
(I)

The condensation during the second stage is carried out in accordance with the work described by El. Anderson in *J. Org. Chem.*, 30, page 3959 (1965).

The following example is given by way of illustration only:

EXAMPLE.

First stage: preparation of N,N-diethyl-(3-isobutoxy-2-chloro)-propylamine.

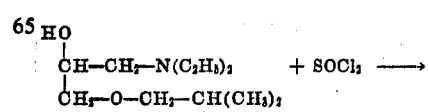

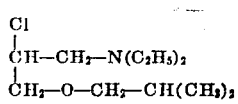

180 g of thionyl chloride in 100 ml anhydrous $CHCl_3$ were added to a solution of 217 g (1 M) of N,N-diethyl-(3-isobutoxy-2-hydroxy)-propylamine in 400 ml anhydrous $CHCl_3$, with stirring and while the temperature was maintained below 55°C.

After the thionyl chloride had been added, the mixture was heated for a further 4 hours under reflux. The solvent and the excess $SOCl_2$ were evaporated off and the product was poured on to crushed ice and made alkaline with 33 percent aqueous NaOH. The product was extracted with ether, the extract dried over anhydrous $Na_2SO_4$, the ether was evaporated off, and the residue distilled in vacuo to give 204 g of the above-named product.

b.p.(2 mm Hg) = 83° ; $n_D^{20°}$= 1.4390; Yield: 86 percent.

Second stage: preparation of N,N-diethyl-[3-isobutoxy-2-(diphenyl-hydroxy)-methyl]-propylamine.

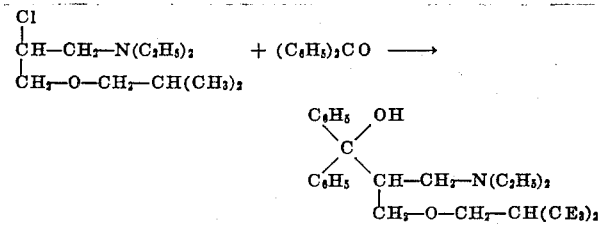

5 g of sodium were rapidly dissolved in 300 ml liquid ammonia. 18.2 g benzophenone (0.1 M) dissolved in anhydrous ether were then added. The reaction was allowed to continue for 15 minutes and 22.2 g of the previously prepared halogen derivative were added to the resulting mauve solution. The color changed slowly to orange-yellow.

After continuing the reaction for 4 hours, 11 g of $NH_4Cl$ was added and the $NH_3$ formed was allowed to evaporate. The residue was dissolved in water and ether. After decantation, the ethereal phase was extracted with an approx. 4N HCl solution. The aqueous solution was then made alkaline with 40% NaOH and the organic product was extracted with ether.

After the ether had been evaporated, the residue was dissolved in ethyl acetate and ethanol saturated with HCl was added in sufficient quantity to obtain the hydrochloride.

Analysis of the product obtained gave the following result:

|     | Calculated | Found |            |
|-----|-----------|-------|------------|
| C%  | 71.02     | 70.56 | M.P. = 135°C |
| H%  | 8.63      | 8.21  | M = 406.02 |
| N%  | 3.45      | 3.45  | Yield = 60% |

A similar method was used to prepare compounds of formula I in which the substituents Ar and Ar' are phenyl groups and the substituents R and A have the meanings given in Table I hereinafter. Table I also gives the melting point of each compound and the results of analytical tests. Compound No. 1 was the product prepared in the preceding example.

TABLE I

| Compound No. | R | A | Hydrochloride M.P. (° C.) | HCl calculated | HCl found |
|---|---|---|---|---|---|
| 1 | $CH_3$\CH—$CH_2$—/$CH_3$ | $C_2H_5$\N—/$C_2H_5$ | 135 | 0.01 | 9.00 |
| 2 | $CH_3$\CH—$CH_2$—$CH_2$—/$CH_3$ | (morpholino) | 154 | 8.44 | 8.50 |
| 3 | Same as above | (pyrrolidino) | 150 | 8.75 | 8.90 |
| 4 | do | (piperidino) | 135 | 8.34 | 8.35 |
| 5 | do | $C_2H_5$\N—/$C_2H_5$ | (ª) | (ᵇ) | (ᶜ) |
| 6 | $CH_3$\CH—$CH_2$—/$CH_3$ | (pyrrolidino) | 150 | 9.02 | 9.00 |
| 7 | $CH_3$— | (morpholino) | 190 | 9.7 | 9.55 |
| 8 | $CH_3$— | (pyrrolidino) | 190 | 10.01 | 10.01 |
| 9 | $CH_3$— | $C_2H_5$\N—/$C_2H_5$ | 170 | 10.01 | 9.98 |
| 10 | $CH_3$— | (piperidino) | 140 | 9.73 | 9.65 |
| 11 | $C_2H_5$— | (morpholino) | 163 | 9.32 | 9.28 |

TABLE I—Continued

| Compound No. | R | A | Hydrochloride M.P. (°C.) | HCl calculated | HCl found |
|---|---|---|---|---|---|
| 12 | $C_2H_5-$ | (pyrrolidinyl) | 120 | 9.72 | 9.56 |
| 13 | $C_2H_5-$ | (piperidinyl) | 130 | 9.36 | 9.38 |
| 14 | $C_2H_5-$ | $C_2H_5-N-C_2H_5$ | 162 | 9.72 | 9.59 |
| 15 | (phenyl) | (piperidinyl) | 132 | 8.34 | 8.28 |
| 16 | Same as above | $C_2H_5-N-C_2H_5$ | 142 | 8.57 | 8.70 |
| 17 | do | (pyrrolidinyl) | 176 | 8.62 | 8.73 |
| 18 | $CH_3-$ | $CH_3-N-CH_3$ | 192 | 10.85 | 10.70 | a Fumarate 130°.
b Fumaric acid, calculated 23.3.
c Fumaric acid, found 23.4.

The pharmacodynamic properties of the abovementioned compounds were studied by the following methods:

I. TOXICITY

The acute toxicity in mice was determined by the method of B. Behrens and C. Karber (*Arch.f.Exp.Path. Pharm.*, 177, 379(1935)).

The results obtained for the compounds set out in Table I are shown in Table 2 below.

Table 2

| Compound No. | LD 50 (mg/kg) per os | Compound No. | LD 50 (mg/kg) per os |
|---|---|---|---|
| 1 | >1000 | 10 | 450 |
| 2 | >3000 | 11 | >600 |
| 3 | >3000 | 12 | 385 |
| 4 | >3000 | 13 | >600 |
| 5 | >600 | 14 | 270 |
| 6 | 1010 | 15 | 900 |
| 7 | 600 | 16 | >900 |
| 8 | 200 | 17 | 600<LD50<900 |
| 9 | 127 | 18 | 300 |

II. CARDIO-VASCULAR ACTION

After being anaesthetized with chloralose (an 8% solution, 10 ml/kg I.V.), the test animal was tracheotomized and made to breath artificially; the chest was opened on the right after resection of the fifth rib. The pericardium was opened and a bridge strain gauge was sewn on the right ventricle. A hole was made in the right auricle, through which a catheter of the largest possible diameter was inserted into the coronary sinus and a transfixion point was placed in position and tightened around the auricular opening of the coronary sinus, in order to collect all the blood which flowed out. The animal was treated with heparin (830 units/kg).

The venous blood flowed into a rotameter and then over an oxygen electrode (a Beckman macroelectrode). The blood was returned to circulation through a catheter which was inserted into an external jugular and pushed very close to the auricular opening of the anterior vena cava.

The arterial pressure was recorded at a carotid artery. Cardiographic electrodes were implanted in a $D_2$ arrangement. The following parameters were recorded on a Beckman dynograph:

the coronary venous flow, the partial pressure of oxygen in the coronary venous blood, the carotid arterial pressure, a $D_2$ electrocardiogram for measuring the cardiac frequency, and the strength of the myocardium contractions measured by the ventricular gauge.

The results obtained with the compounds identified in Table 1 are given in Table 3 below, which shows their remarkable activity.

TABLE 3

| Compound No. | Dose, mg./kg. I.V. | Coronary flow, percent | Frequency, percent | Arterial pressure, percent | Ventricular gauge, percent | $PO_2$, percent |
|---|---|---|---|---|---|---|
| 1 | 5 | ↑ 50 | ↓ 28.2 | ↓ 23.8 | ↓ 8.2 | ↑ 126.25 |
| 2 | 5 | ↑ 77.2 | ↓ 10.8 | ↓ 15.4 | ↓ 28.8 | ↑ 103.2 |
| 3 | 5 | ↑ 107.6 | ↓ 21.2 | ↓ 23.2 | ↓ 19 | ↑ 187.4 |
| 4 | 5 | ↑ 64.2 | ↓ 9 | ↓ 15.8 | ↓ 14.4 | ↑ 129 |
| 5 | 5 | ↑ 84.1 | ↓ 21.5 | ↓ 25.1 | ↑ 10.8 | ↑ 115.7 |
| 6 | 5 | ↑ 56 | ↓ 22 | ↓ 17.8 | ↓ 14 | ↑ 192 |
| 7 | 5 | ↑ 9 | (a) | ↓ 15 | ↓ 2 | (a) |
| 8 | 5 | ↑ 33 | ↑ 17 | ↓ 14 | ↑ 18 | (a) |
| 9 | 5 | ↑ 56 | ↓ 14 | ↑ 6 | ↑ 7 | (b) |
| 10 | 5 | ↑ 17 | ↓ 10 | ↑ 6 | ↑ 6 | (b) |
| 11 | 5 | ↑ 18 | ↑ 16 | ↑ 19 | ↑ 16 | ↓ 15 |
| 12 | 5 | ↑ 112 | ↑ 8 | ↑ 35 | ↑ 46 | ↑ 143 |
| 13 | 5 | ↑ 32 | ↓ 15 | ↑ 5 | ↓ 24 | ↑ 115 |
| 14 | 5 | ↑ 42 | ↓ 31 | ↓ 24 | ↓ 27 | ↑ 96 |
| 15 | | TEST NOT EFFECTED | | | | |
| 16 | 5 | ↑ 58 | ↓ 28 | ↓ 30 | ↓ 35 | ↑ 109 |
| 17 | 5 | ↑ 37 | ↓ 47 | ↓ 45 | ↓ 32 | ↓ 55 |
| 18 | 5 | ↑ 56 | ↑ 3 | • 5 | ↓ 7 | ↓ 27 | a Unmodified.  b Unmeasurable.

III. ACTION ON THE CENTRAL NERVOUS SYSTEM

A. Study of the spontaneous mobility of the mouse (Openfield test)

Procedure.

Male animals having a weight of from 17 to 20g were divided into groups of 10 and received, by oesophageal intubation, after fasting for 2 hours, the compound to be tested (treated animals) or an equivalent quantity of the solvent used (control animals).

One hour after the administration of the compound or the solvent, the animals were placed in groups of two in a circular passage. The latter was swept by six beams of infra-red light. The beams were radially directed, equidistant and each centred on a photo-electric cell.

Each breaking of a beam caused by the passage of an animal was recorded on a counter. The number of breaks, and therefore of movements of the two animals, was taken at the end of 10 minutes. The results obtained with the treated animals were expressed in the form of a percentage increase or reduction with respect to those obtained with the controls.

B. Study on protection against a lethal dose of cardiazol

Groups of 10 male mice having an averagee weight of 23 g received orally the compound to be tested (or, in the case of the controls, the equivalent weight of the physiological solvent used) and 30 minutes afterwards, 100 mg/kg of cardiazol (pentetrazol), a convulsant of predominantly cortical action, were administered intraperitoneally to the animals.

The number of animals which did not die during the 60 minutes following the injection of cardiazol were noted.

C. Protective action in mice with respect to supramaximal electric shock and a lethal dose of strychnine.

Procedure.

One hour after receiving the compound to be tested orally, groups of 10 male mice weighing from 22 to 26 g, were subjected to a supramaximal electric shock (square current of constant intensity: 50 milliamps, 40 cycles/second, 10 milliseconds over a period of 0.2 seconds by means of corneal electrodes). The presence or the absence of tonic extension and its duration, and of clonic convulsions and their duration, were noted. The results are expressed as percentage protection against tonic extension with respect to a group of control animals.

Fifteen minutes later, the same mice received subcutaneously 1.5 mg/kg of strychnine sulphate, a convulsant poison of predominantly medullar action. The number of animals which did not die during the 60 minutes following the injection of strychnine were noted.

The results obtained are shown in Table 4 below.

Table 4

| Compound No. | Action against mobility (Dose:80mg/kg per os) | Action against lethal dose of cardiazol % protection (Dose:50mg/kg per os) | Action against supramaximal electric shock Dose(mg/kg) per os | % protection |
|---|---|---|---|---|
| 1 | ↓ 23% | 0 | 400 | 0 |
| 2 | TEST NOT EFFECTED | — | TEST NOT EFFECTED | |
| 3 | ↓17.5 % | 0 | TEST NOT EFFECTED | |
| 4 | ↓ 14% | 0 | 1000 | 0 |
| 5 | ↓ 10% | 0 | 1000 | 20% |
| 6 | ↓ 12% | 0 | 250 | 0 |
| 7 | ↑ 80% | 45% | 50 | 50% |
| 8 | ↑ 43% | 100% | 20% | 40% |
| 9 | ↑ 22% | 85% | 25 | 80% |
| 10 | ↑ 70% | 0 | 100 | 90% |
| 11 | ↑ 82% | 0 | 100 | 0 |
| 12 | ↑ 60% | 50% | 25 | 40% |
| 13 | ↑ 61% | 0 | 300 | 50% |
| 14 | ↑ 56% | 50% | 50 | 70% |
| 15 | ↑ 53% | 0 | 250 | 0 |
| 16 | ↑ 54% | 0 | 300 | 0 |
| 17 | ↑ 64% | 0 | 300 | 0 |
| 18 | ED 50 = 6mg/kg per os | 100 % (ED 50 = 17 mg/kg per os | 20 | 54% |

IV. BACTERIOSTATIC ACTIVITY

Procedure.

The study was carried out by the dilution method in liquid medium (variable volume dilution method). The medium used was the standard broth for the study of antibiotics (Institut Pasteur of Paris, Cassagne 1961). Dilutions of the compounds to be tested were added to the medium to obtain final concentrations ranging stepwise from 10 to 500 µg/ml. These dilutions were obtained in distilled water from a mother solution in ethylene glycol.

The test bacteria used were a strain of *staphylococcus aureus* Oxford A268 and of *Escherichia coli* 548 IP. The tubes were inoculated with dilutions of a 24 hour culture of the bacteria so as to obtain a final dilution of the inoxulum of $10^{-3}$ for the *staphylococcus* and of $10^{-4}$ for the *Escherichia coli*. The tubes were placed in an oven maintained at 37°C and examined after 24 hours and 48 hours. The minimum concentration which totally inhibited the bacteria studied was noted (the minimum inhibiting concentration, M.I.C., is expressed in µg/ml).

Results:

| Compound No. | Staphylococcus | Coli bacillus |
|---|---|---|
| 1 | 50–100 μg/ml | >500 μg/ml |
| 3 | 30–100 μg/ml | 500 μg/ml |

The compounds of formula I therefore appear to be suitable for the treatment of the following indications:

myocardic anoxia,
coronary insufficiency, angina,
myocardial infarctus, and
cardiac insufficiency linked with coronary circulation difficulties. They also have anti-convulsant and central nervous system stimulating activity.

For use in human or veterinary medicine, the compounds of formula I may be administered orally, rectally or parenterally. For oral administration, they may be formulated, for example, as compressed tablets, pastilles, capsules or granules; dosage units for oral administration preferably contain 0.250 g of the active compound.

For rectal administration, they may be formulated as suppositories or rectal capsules, preferably containing 0.50 g of the active compound. A dose of 0.050 g is preferably used with parenteral administration. In each case, the active compounds are associated with an inert, physiologically acceptable excipient or carrier appropriate to the intended mode of administration.

What we claim is:

1. A 3-alkoxy- or 3-aryloxy-2-(diaryl-hydroxy)-methyl-propylamine of the formula

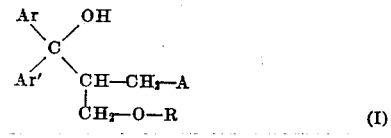

in which Ar and Ar' are phenyl, R is a lower alkyl group or phenyl, and A is

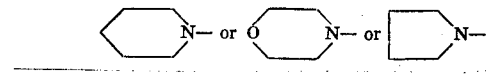

* * * * *